US012664931B2

(12) United States Patent
Kim et al.

(10) Patent No.: US 12,664,931 B2
(45) Date of Patent: Jun. 23, 2026

(54) DISPLAY DEVICE HAVING A VARIABLE DRIVING FREQUENCY

(71) Applicant: Samsung Display Co., Ltd., Yongin-Si (KR)

(72) Inventors: Hong-Kyu Kim, Suwon-si (KR); Myeongsu Kim, Hwaseong-si (KR); Po-Yun Park, Seoul (KR); Dong-Hyun Yeo, Yongin-si (KR); Woojung Jung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/767,983

(22) Filed: Jul. 10, 2024

(65) Prior Publication Data

US 2024/0363059 A1 Oct. 31, 2024

Related U.S. Application Data

(62) Division of application No. 17/202,253, filed on Mar. 15, 2021, now abandoned.

(30) Foreign Application Priority Data

Sep. 2, 2020 (KR) ........................ 10-2020-0111613

(51) Int. Cl.

| | |
|---|---|
| ***G09G 3/32*** | (2016.01) |
| ***G09G 3/22*** | (2006.01) |
| ***G09G 3/3208*** | (2016.01) |
| ***G09G 3/3233*** | (2016.01) |

(Continued)

(52) U.S. Cl.

CPC ................. *G09G 3/32* (2013.01); *G09G 3/22* (2013.01); *G09G 3/3208* (2013.01); (Continued)

(58) Field of Classification Search

CPC .......... G09G 3/22; G09G 3/32; G09G 3/3208; G09G 3/3233; G09G 3/3266; (Continued)

(56) References Cited

U.S. PATENT DOCUMENTS

| | | | | |
|---|---|---|---|---|
| 10,467,964 B2 | 11/2019 | Gupta et al. | | |
| 2015/0170578 A1* | 6/2015 | Choi | .................... | G09G 3/3266 345/212 |

(Continued)

FOREIGN PATENT DOCUMENTS

| | | |
|---|---|---|
| KR | 10-2016-0052942 A | 5/2016 |
| KR | 10-2020-0033368 A | 3/2020 |
| KR | 10-2020-0033756 A | 3/2020 |

*Primary Examiner* — Jason M Mandeville

(74) *Attorney, Agent, or Firm* — Innovation Counsel LLP

(57) ABSTRACT

A display device includes a display panel that includes a plurality of pixels, a data driver configured to provide a data voltage to the plurality of pixels, a scan driver configured to provide a first scan signal and a second scan signal to the plurality of pixels, and a controller configured to control the data driver and the scan driver. The display panel is driven at a driving frequency that is variable within a driving frequency range. The scan driver provides the first scan signal to the plurality of pixels at the driving frequency, and provides the second scan signal to the plurality of pixels at a second driving frequency that is equal to or higher than the driving frequency.

2 Claims, 14 Drawing Sheets

(51) Int. Cl.
*G09G 3/3266* (2016.01)
*G09G 3/3275* (2016.01)

(52) U.S. Cl.
CPC ......... *G09G 3/3233* (2013.01); *G09G 3/3266* (2013.01); *G09G 3/3275* (2013.01); *G09G 2300/0842* (2013.01); *G09G 2310/0251* (2013.01); *G09G 2310/0278* (2013.01); *G09G 2310/061* (2013.01); *G09G 2320/0233* (2013.01); *G09G 2320/103* (2013.01); *G09G 2340/0435* (2013.01)

(58) Field of Classification Search
CPC ......... G09G 3/3275; G09G 2310/0251; G09G 2310/0278; G09G 2310/061; G09G 2300/0842; G09G 2320/0233; G09G 2320/103; G09G 2340/0435
USPC .......................................................... 345/76
See application file for complete search history.

(56) References Cited

U.S. PATENT DOCUMENTS

| | | | | |
|---|---|---|---|---|
| 2015/0243203 | A1 | 8/2015 | Kim et al. | |
| 2018/0061311 | A1 | 3/2018 | Lin et al. | |
| 2018/0293939 | A1* | 10/2018 | Kim | G09G 3/3233 |
| 2019/0378459 | A1* | 12/2019 | Kim | G09G 3/3291 |
| 2020/0090596 | A1 | 3/2020 | Oh et al. | |
| 2020/0211475 | A1* | 7/2020 | Park | G09G 3/2007 |
| 2020/0226978 | A1* | 7/2020 | Lin | H10K 59/1213 |
| 2020/0388229 | A1 | 12/2020 | Zhang et al. | |

* cited by examiner

DISPLAY DEVICE HAVING A VARIABLE DRIVING FREQUENCY

CROSS-REFERENCE TO RELATED APPLICATION(S)

This application is a divisional application of U.S. patent application Ser. No. 17/202,253 filed on Mar. 15, 2021, which claims priority under 35 USC § 119 to Korean Patent Application No. 10-2020-0111613, filed on Sep. 2, 2020 in the Korean Intellectual Property Office (KIPO), the disclosure of which is incorporated herein by reference in their entireties.

BACKGROUND

1. Field

The present disclosure relates to display devices, and more particularly to a display device having a variable driving frequency.

2. Description of the Related Art

In general, a display device may display an image at a frame frequency (or a constant frame rate) of about 60 Hz, about 120 Hz, about 240 Hz, or the like. However, a host processor (e.g., a graphic processing unit (GPU) or a graphic card) may provide frame data to the display device at a frame frequency of rendering that is different from the frame frequency of the display device. In particular, when the host processor provides the display device with frame data that requires complicated rendering (e.g., gaming image data), such a frame frequency mismatch may be intensified, and a tearing phenomenon may occur at or near a boundary of the displayed image of the display device due to the frame frequency mismatch.

To prevent or reduce the tearing phenomenon, a variable frame mode (e.g., FreeSync™ trademarked by Advanced Micro Devices of Santa Clara, California, G-Sync™ trademarked by NVIDIA Corporation, Santa Clara, California) has been developed in which a host processor provides frame data to a display device at a variable frame frequency by changing a time (or a duration of time) of a blank period in a frame period. A display device supporting a variable frame mode may display an image in synchronization with the variable frame frequency, or may drive a display panel at a variable driving frequency, thereby reducing or preventing the tearing phenomenon.

However, in the display device operating in a variable frame mode, luminance of the display panel may vary depending on a driving frequency of the display panel, and a flicker may occur due to a change of the driving frequency.

SUMMARY

The present disclosure provides a display device capable of reducing a luminance difference between different driving frequencies.

According to one embodiment, a display device includes: a display panel including a plurality of pixels, a data driver configured to provide a data voltage to the plurality of pixels, a scan driver configured to provide a first scan signal and a second scan signal to the plurality of pixels, and a controller configured to control the data driver and the scan driver. The display panel is driven at a driving frequency that is variable within a driving frequency range. The scan driver provides the first scan signal to the plurality of pixels at the driving frequency, and provides the second scan signal to the plurality of pixels at a second driving frequency that is equal to or higher than the driving frequency.

In one embodiment, a pixel of the plurality of pixels may include a capacitor including a first electrode that is coupled to a gate node, and a second electrode that is coupled to a source node, a first transistor including a gate that is coupled to the gate node, a drain receiving a power supply voltage, and a source that is coupled to the source node, a second transistor configured to transfer the data voltage to the gate node in response to the first scan signal, a third transistor configured to transfer a reference voltage to the source node in response to the second scan signal, and a light emitting diode configured to emit light based on a driving current generated by the first transistor.

In one embodiment, in a first period in which the first scan signal and the second scan signal are applied to the plurality of pixels, the capacitor may store the data voltage. In a second period in which the first scan signal is not applied, and the second scan signal is applied to the plurality of pixels, the third transistor may apply the reference voltage to the source node, and the light emitting diode does not emit light.

In one embodiment, the reference voltage may be lower than a threshold voltage of the light emitting diode.

In one embodiment, the controller may be further configured to receive input image data at a variable input frame frequency that is variable within the driving frequency range, and the driving frequency of the display panel may be determined as the variable input frame frequency.

In one embodiment, a frame period of the display device may include an active period having a constant time length, and a variable blank period having a variable time length.

In one embodiment, in the active period, the scan driver may provide the first scan signal and the second scan signal to the plurality of pixels. In the variable blank period, the scan driver may not provide the first scan signal to the plurality of pixels, and may provide the second scan signal at least once to the plurality of pixels in a case where the variable input frame frequency is lower than the second driving frequency.

In one embodiment, the controller may include a first scan control signal generator configured to provide a first scan control signal to the scan driver in the active period, a second scan control signal generator configured to generate an active scan control signal in the active period, an input frequency detector configured to detect the variable input frame frequency, a third scan control signal generator configured to generate a blank scan control signal in the variable blank period in a case where the variable input frame frequency detected by the input frequency detector is lower than the second driving frequency, and an OR gate configured to generate a second scan control signal by performing an OR operation on the active scan control signal and the blank scan control signal, and to provide the second scan control signal to the scan driver.

In one embodiment, the controller may include: a first scan control signal generator configured to provide a first scan control signal to the scan driver in the active period, a blank time counter configured to count a time of the variable blank period, and a second scan control signal generator configured to provide a second scan control signal having a plurality of pulses respectively corresponding to a plurality of pixel rows of the display panel to the scan driver in the active period, and to provide the second scan control signal in a reference period of the variable blank period to the scan driver based on the time of the variable blank period counted by the blank time counter reaching a reference time.

In one embodiment, the reference time may correspond to a blank time of the variable blank period corresponding to the second driving frequency, and the reference period may include a frame time of the frame period corresponding to the second driving frequency.

In one embodiment, the controller may be further configured to receive input image data at the second driving frequency within the driving frequency range, and may determine the driving frequency of the display panel according to the input image data representing a still image.

In one embodiment, the controller may include: a still image detector configured to determine whether the input image data represent the still image, and a driving frequency decider configured to determine the driving frequency of the display panel as the second driving frequency in a first case where the input image data do not represent the still image, and to determine the driving frequency of the display panel as a frequency lower than the second driving frequency within the driving frequency range in a second case where the input image data represent the still image.

In one embodiment, in a first case where the input image data do not represent the still image, the controller may set a frame period as a driving frame period in which the display panel is driven. In a second case where the input image data represent the still image, the controller may set at least one first frame period of a plurality of frame periods as the driving frame period, and may set at least one second frame period of the plurality of frame periods as a non-driving frame period in which the display panel is not driven.

In one embodiment, in the driving frame period, the scan driver may provide the first scan signal and the second scan signal to the plurality of pixels. In the non-driving frame period, the scan driver may not provide the first scan signal to the plurality of pixels, and may provide the second scan signal to the plurality of pixels.

According to one embodiment, a display device includes: a display panel including a plurality of pixels, a data driver configured to provide a data voltage to the plurality of pixels, a scan driver configured to provide a first scan signal and a second scan signal to the plurality of pixels, and a controller configured to control the data driver and the scan driver, and to receive input image data at a variable input frame frequency that is variable within a driving frequency range. The scan driver provides the first scan signal to the plurality of pixels at the variable input frame frequency, and provides the second scan signal to the plurality of pixels at a maximum driving frequency within the driving frequency range.

In one embodiment, a pixel of the plurality of pixels may include a capacitor including a first electrode that is coupled to a gate node, and a second electrode that is coupled to a source node, a first transistor including a gate that is coupled to the gate node, a drain receiving a power supply voltage, and a source that is coupled to the source node, a second transistor configured to transfer the data voltage to the gate node in response to the first scan signal, a third transistor configured to transfer a reference voltage to the source node in response to the second scan signal, and a light emitting diode configured to emit light based on a driving current generated by the first transistor.

In one embodiment, a frame period of the display device may include an active period having a constant time length, and a variable blank period having a variable time length. In the active period, the scan driver may provide the first scan signal and the second scan signal to the plurality of pixels. In the variable blank period, the scan driver may not provide the first scan signal to the plurality of pixels, and may provide the second scan signal at least once to the plurality of pixels in a case where the variable input frame frequency is lower than the maximum driving frequency.

According to one embodiment, a display device includes: a display panel including a plurality of pixels, a data driver configured to provide a data voltage to the plurality of pixels, a scan driver configured to provide a first scan signal and a second scan signal to the plurality of pixels, and a controller configured to control the data driver and the scan driver, to receive input image data at a fixed input frame frequency, to determine a driving frequency of the display panel as the fixed input frame frequency in a first case where the input image data do not represent a still image, and to determine the driving frequency of the display panel as a frequency that is lower than the fixed input frame frequency in a second case where the input image data represent the still image. The scan driver provides the first scan signal to the plurality of pixels at the driving frequency, and provides the second scan signal to the plurality of pixels at the fixed input frame frequency.

In one embodiment, a pixel of the plurality of pixels may include a capacitor including a first electrode that is coupled to a gate node, and a second electrode that is coupled to a source node, a first transistor including a gate that is coupled to the gate node, a drain receiving a power supply voltage, and a source that is coupled to the source node, a second transistor configured to transfer the data voltage to the gate node in response to the first scan signal, a third transistor configured to transfer a reference voltage to the source node in response to the second scan signal, and a light emitting diode configured to emit light based on a driving current generated by the first transistor.

In one embodiment, in a first case where the input image data do not represent the still image, the controller may set a frame period as a driving frame period in which the display panel is driven. In a second case where the input image data represent the still image, the controller may set at least one first frame period of a plurality of frame periods as the driving frame period, and may set at least one second frame period of the plurality of frame periods as a non-driving frame period in which the display panel is not driven. In the driving frame period, the scan driver may provide the first scan signal and the second scan signal to the plurality of pixels. In the non-driving frame period, the scan driver may not provide the first scan signal to the plurality of pixels, and may provide the second scan signal to the plurality of pixels.

As described above, a display panel included in a display device may be driven in a variable frame mode at a driving frequency that is variable or changeable within a driving frequency range. A scan driver may provide a first scan signal to each pixel at the driving frequency, and may provide a second scan signal to each pixel at a maximum driving frequency within the driving frequency range. Accordingly, the display panel may reduce or prevent a luminance difference when it is driven at different driving frequencies.

BRIEF DESCRIPTION OF THE DRAWINGS

Illustrative, non-limiting embodiments of the present disclosure will be more clearly understood from the following detailed description in conjunction with the accompanying drawings.

DETAILED DESCRIPTION OF EMBODIMENTS

Figure 1:
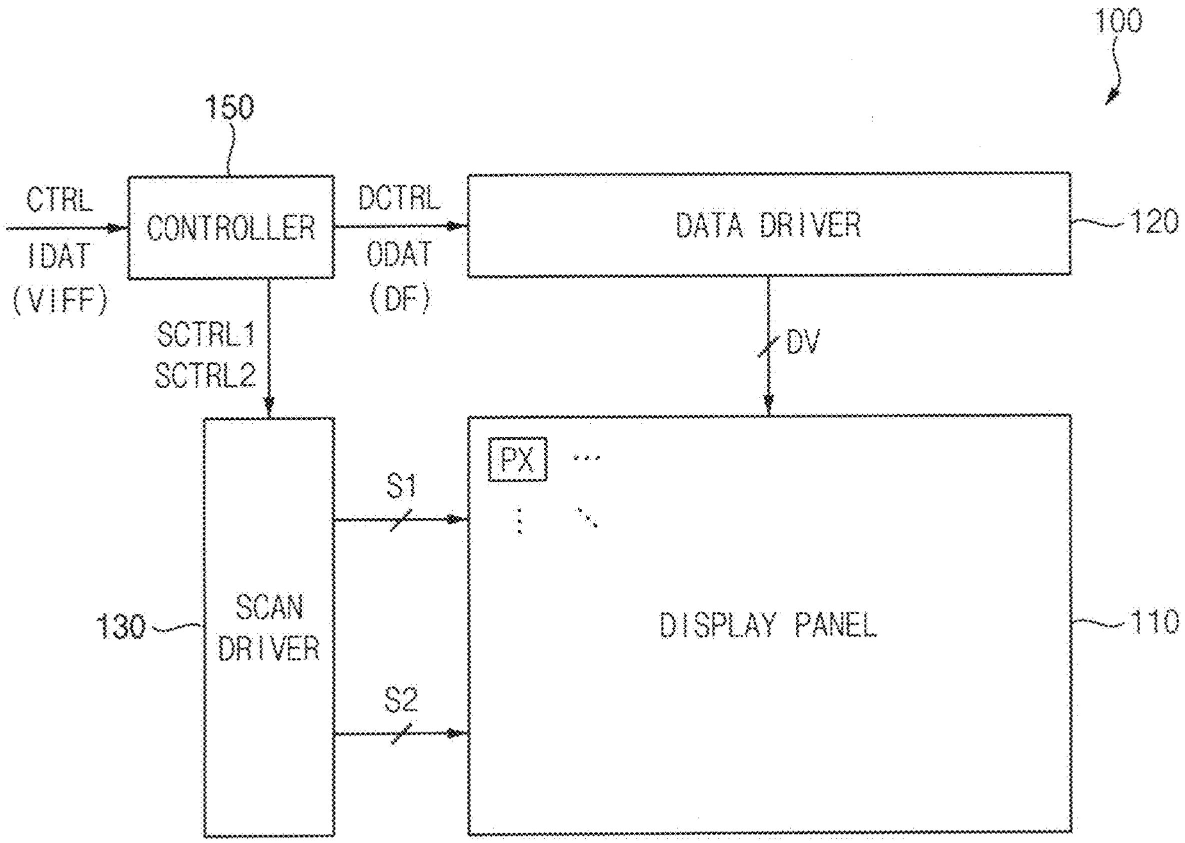
FIG. 1 is a block diagram illustrating a display device according to one embodiment.

The embodiments of the present disclosure are described more fully hereinafter with reference to the accompanying drawings. Like or similar reference numerals refer to like or similar elements throughout the present disclosure.

Figure 2:
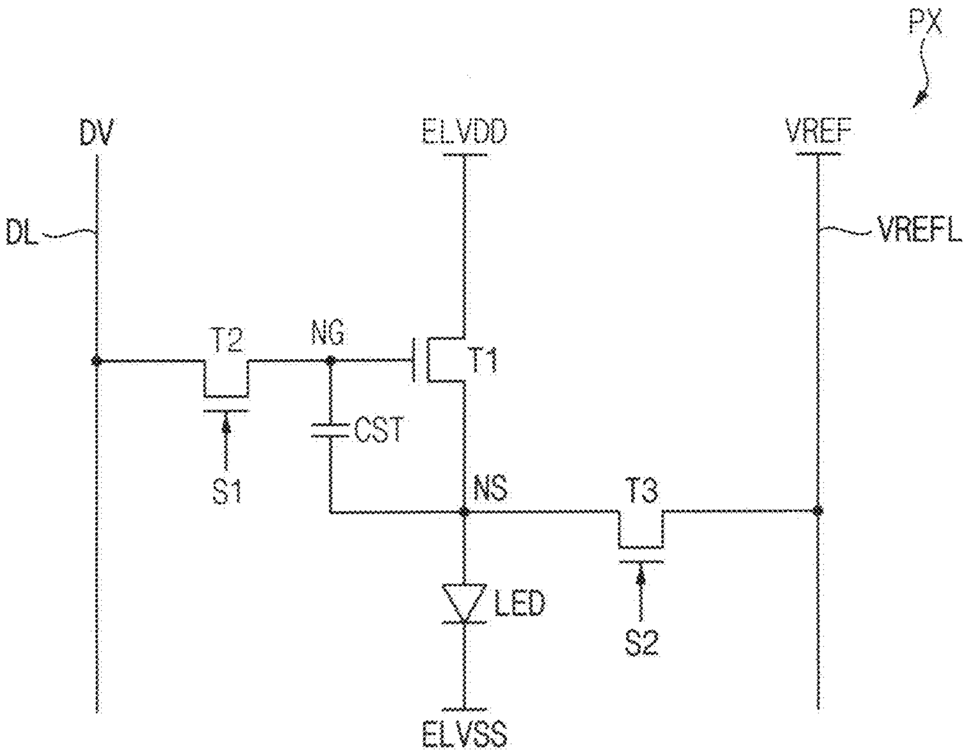
FIG. 2 is a circuit diagram illustrating an example of a pixel included in a display device according to one embodiment.
Figure 3:
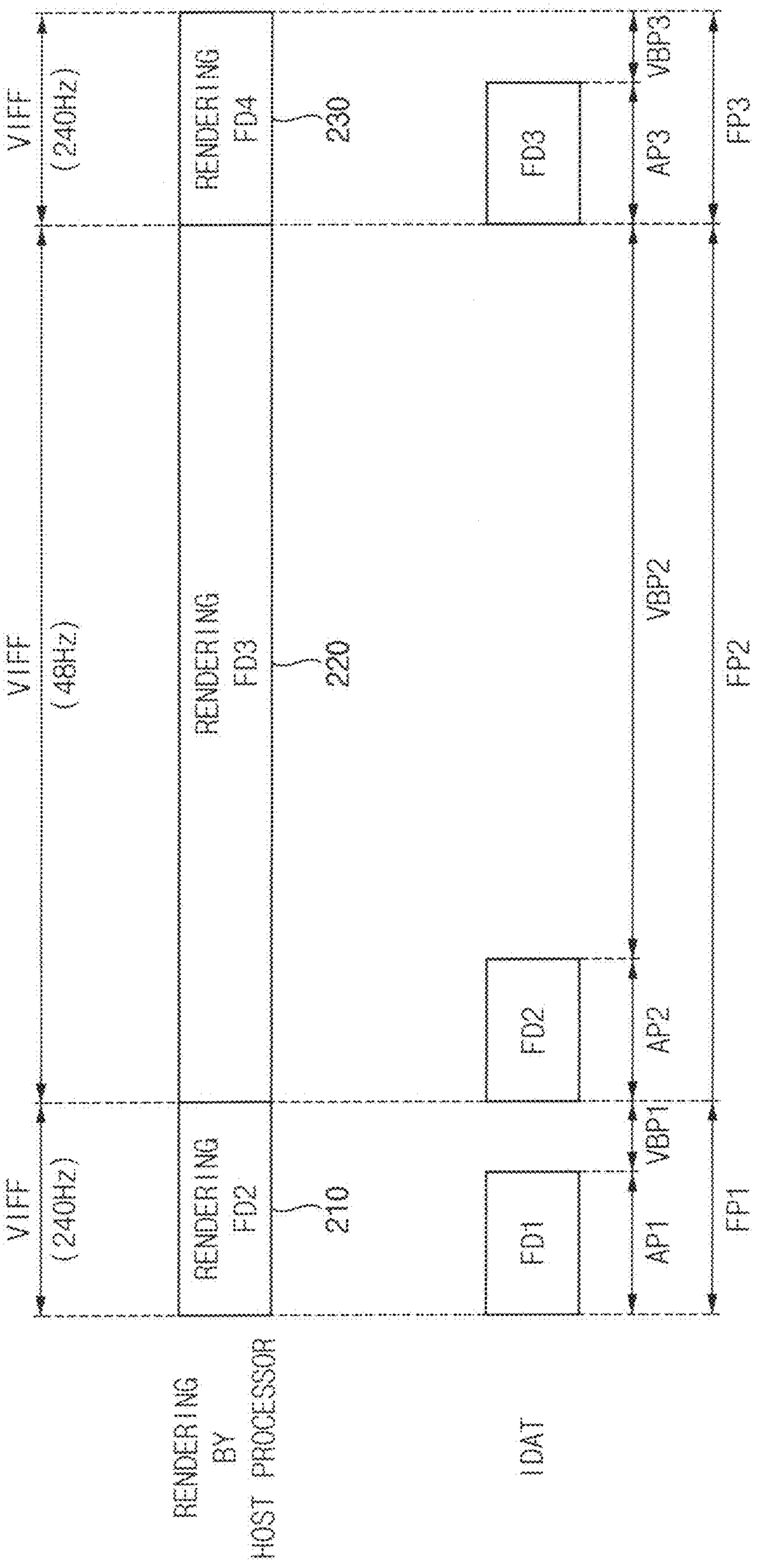
FIG. 3 is a timing diagram illustrating an example of input image data that are input at a variable input frame frequency.
Figure 4:
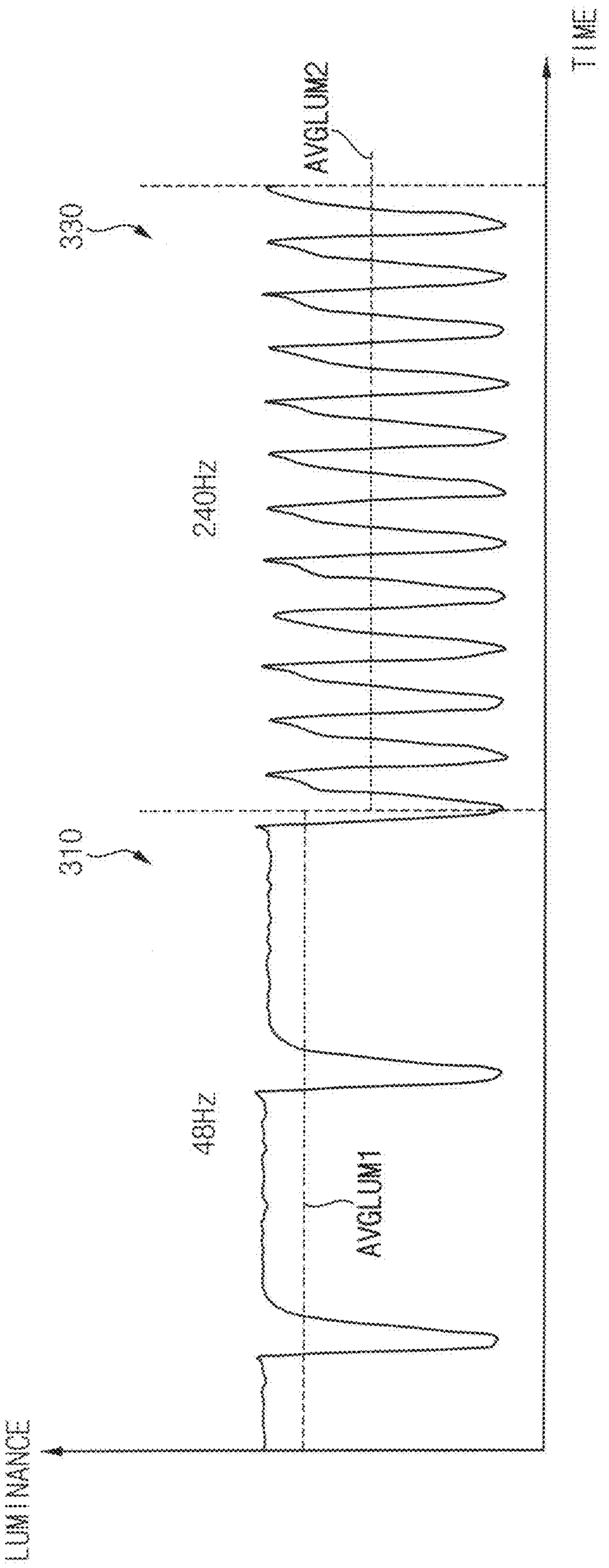
FIG. 4 is a diagram illustrating an example of luminances of a display panel driven at different driving frequencies in a conventional display device.
Figure 5:
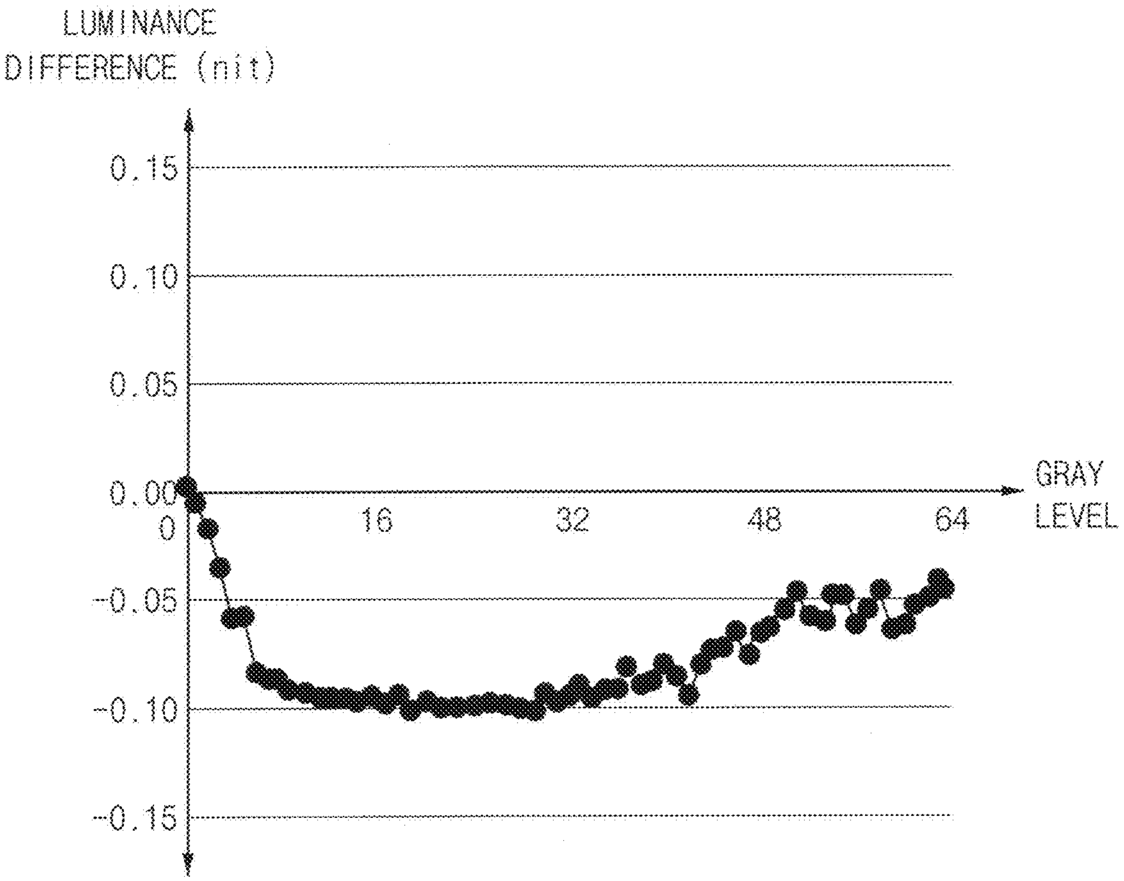
FIG. 5 is a diagram illustrating an example of a luminance difference of a display panel driven at different driving frequencies in a conventional display device.
Figure 6:
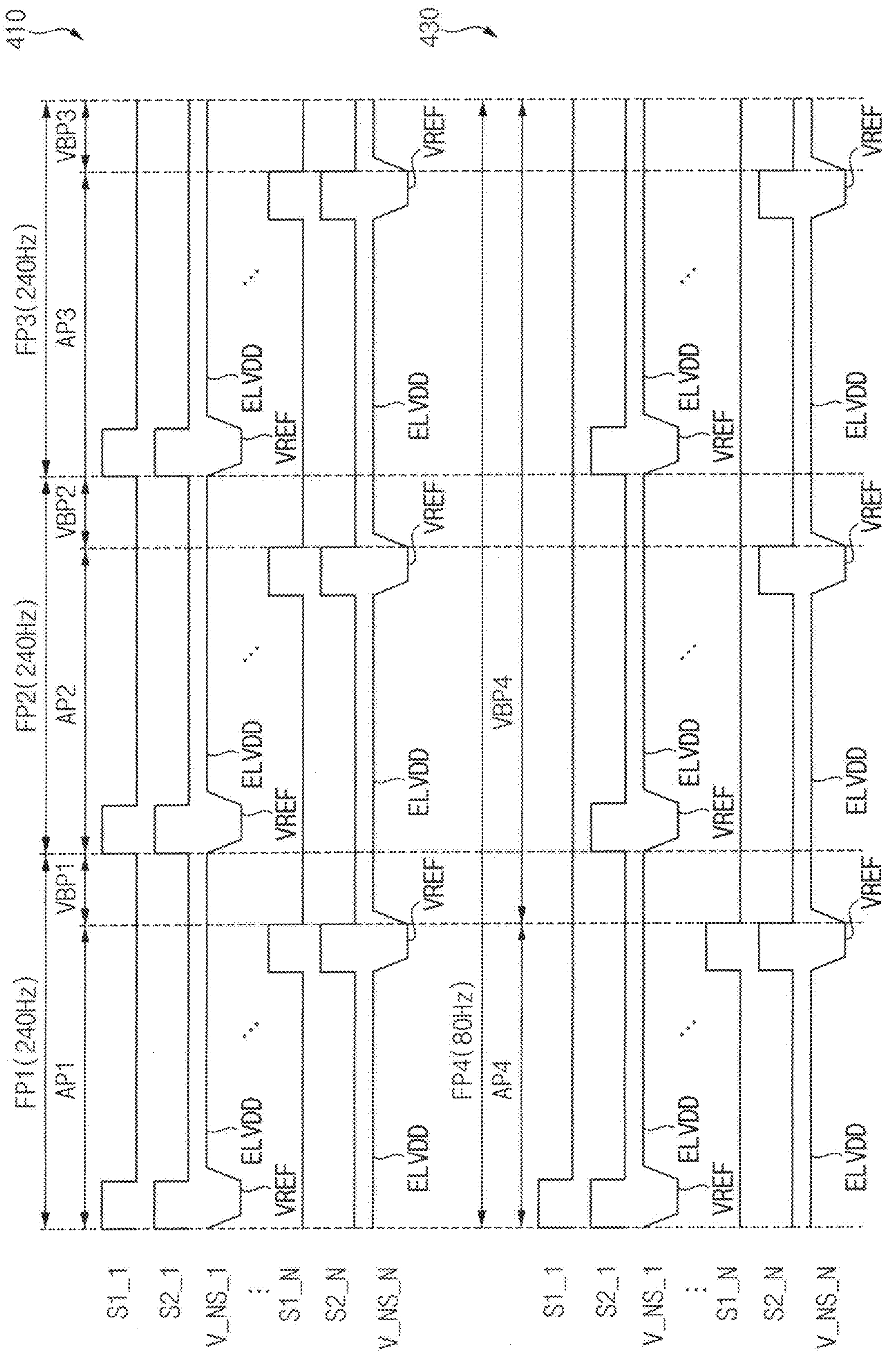
FIG. 6 is a timing diagram illustrating an example of signals and voltages for a plurality of pixels in a case where a display panel is driven at different driving frequencies.
Figure 7:
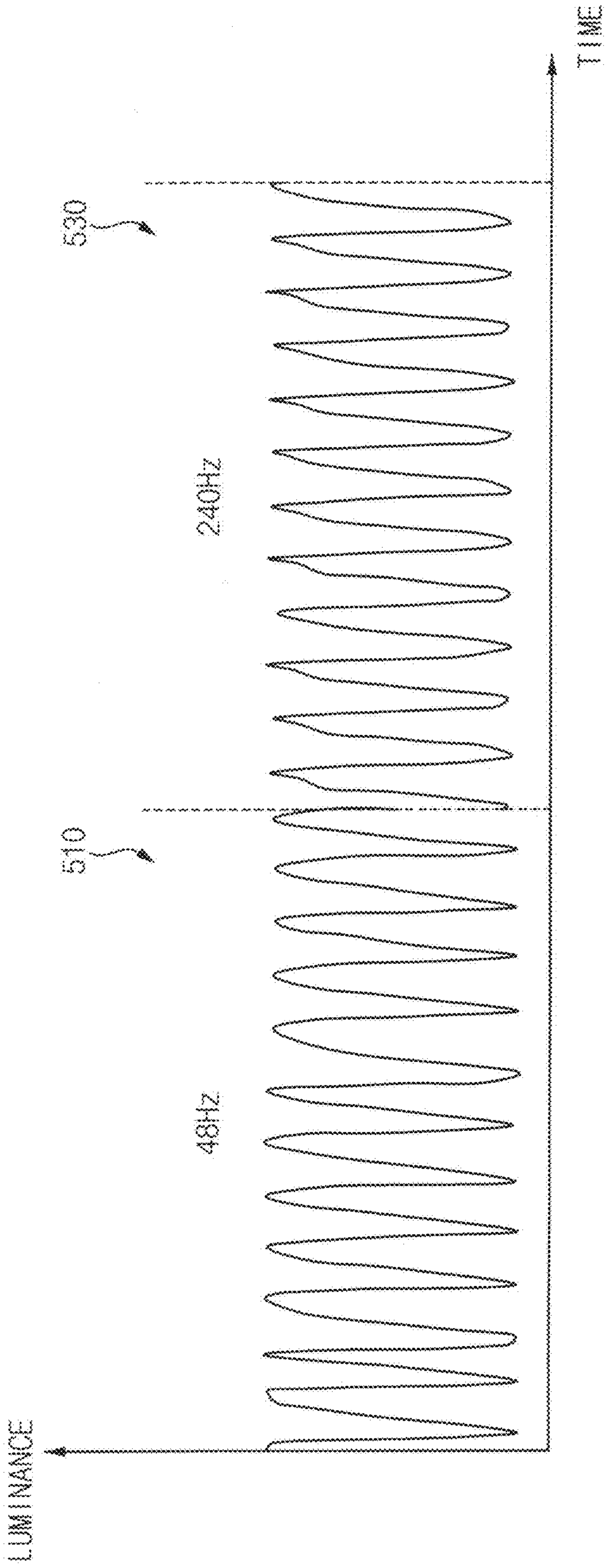
FIG. 7 is a diagram illustrating an example of luminances of a display panel driven at different driving frequencies in a display device according to one embodiment.

FIG. 1 is a block diagram illustrating a display device according to one embodiment, FIG. 2 is a circuit diagram illustrating an example of a pixel included in a display device according to one embodiment, FIG. 3 is a timing diagram illustrating an example of input image data that are input at a variable input frame frequency, FIG. 4 is a diagram illustrating an example of luminances of a display panel driven at different driving frequencies in a conventional display device, FIG. 5 is a diagram illustrating an example of a luminance difference of a display panel driven at different driving frequencies in a conventional display device, FIG. 6 is a timing diagram illustrating an example of signals and voltages for a plurality of pixels in a case where a display panel is driven at a maximum driving frequency, and an example of signals and voltages for the plurality of pixels in a case where the display panel is driven at a driving frequency lower than the maximum driving frequency, and FIG. 7 is a diagram illustrating an example of luminances of a display panel driven at different driving frequencies in a display device according to one embodiment.

Referring to FIG. 1, a display device 100 according to one embodiment may include a display panel 110 including a plurality of pixels PX, a data driver 120 that provides a data voltage DV to each of the plurality of pixels PX, a scan driver 130 that provides a first scan signal S1 and a second scan signal S2 to each of the plurality of pixels PX, and a controller 150 that controls the data driver 120 and the scan driver 130.

The display panel 110 may include a plurality of data lines transferring the data voltage DV, a plurality of first and second scan lines respectively transferring the first and second scan signals S1 and S2, and the plurality of pixels PX coupled to the plurality of data lines and the plurality of first and second scan lines. The display panel 110 may further include a plurality of reference voltage lines (not shown) for providing a reference voltage to the plurality of pixels PX. In some embodiments, the plurality of reference voltage lines may extend in a vertical direction (or a direction of the data line), and may be parallel with the plurality of data lines. Further, in some embodiments, the plurality of reference voltage lines may be used as, but not limited to, sensing lines for sensing characteristics of the plurality of pixels PX. In other embodiments, the plurality of reference voltage lines may be coupled to each other in a mesh structure, but a configuration of the plurality of reference voltage lines is not limited to the mesh structure. In some embodiments, each pixel PX may include a light emitting diode.

In the example illustrated in FIG. 2, a pixel PX may have a three-transistor, one capacitor (3T1C) structure including a first transistor T1, a second transistor T2, a third transistor T3, a capacitor CST, and a light emitting diode LED.

The capacitor CST may store the data voltage DV that is transferred from the data line DL via the second transistor T2. The capacitor CST may be referred to as a storage capacitor. In some embodiments, the capacitor CST may include a first electrode coupled to a gate node NG, and a second electrode coupled to a source node NS.

The first transistor T1 may generate a driving current based on the data voltage DV stored in the capacitor CST. The first transistor T1 may be referred to as a driving transistor. The first transistor T1 may include a gate coupled to the gate node NG, a drain receiving a first power supply voltage ELVDD, and a source coupled to the source node NS.

The second transistor T2 may transfer the data voltage DV of the data line DL to the gate node NG in response to the first scan signal S1. The second transistor T2 may include a gate receiving the first scan signal S1, a drain coupled to the data line DL, and a source coupled to the gate node NG.

The third transistor T3 may couple the source node NS to a reference voltage line VREFL in response to the second scan signal S2. The data driver 120 (or a power management circuit included in the display device 100) may provide a reference voltage VREF to the reference voltage line VREFL, and the third transistor T3 may transfer the reference voltage VREF of the reference voltage line VREFL to the source node NS in response to the second scan signal S2. In some embodiments, the reference voltage line VREFL may be used as a sensing line for sensing a characteristic of the first transistor T1. The third transistor T3 may include a gate receiving the second scan signal S2, a drain coupled to the reference voltage line VREFL, and a source coupled to the source node NS.

The light emitting diode LED may emit light based on the driving current flowing from a first power supply voltage line of the first power supply voltage ELVDD to a second power supply voltage line of a second power supply voltage ELVSS through the first transistor T1. The light emitting diode LED may include an anode coupled to the source node NS, and a cathode coupled to the second power supply voltage line of the second power supply voltage ELVSS. In one embodiment, the light emitting diode LED may be an organic light emitting diode (OLED). In another embodiment, the light emitting diode LED may be an inorganic light emitting diode, a quantum dot light emitting diode, or any other suitable diode.

In one embodiment, as illustrated in FIG. 2, the first through third transistors T1, T2 and T3 may be implemented as N-type metal-oxide-semiconductor (NMOS) transistors. Further, although FIG. 2 illustrates an example of the pixel PX having the 3T1C structure, the structure of the pixel PX is not limited to the example of FIG. 2. The display panel 110 may be a liquid crystal display (LCD) panel, or any other suitable display panel.

Referring to FIG. 1, the data driver 120 may generate the data voltages DV based on output image data ODAT and a data control signal DCTRL that are received from the controller 150, and may provide the data voltages DV to the plurality of pixels PX through the plurality of data lines. The data control signal DCTRL may include, but not limited to, an output data enable signal, a horizontal start signal and a load signal. The data driver 120 may receive the output image data ODAT from the controller 150 at a driving frequency DF that may be varied or changed within a driving frequency range (e.g., from about 48 Hz to about 240 Hz). In one embodiment, the data driver 120 and the controller 150 may be implemented with a single integrated circuit (IC), and the single integrated circuit may be referred to as a timing controller embedded data driver (TED). In another embodiment, the data driver 120 and the controller 150 may be implemented with separate integrated circuits.

The scan driver 130 may generate the first and second scan signals S1 and S2 based on first and second scan control signals SCTRL1 and SCTRL2 that are received from the controller 150, and may sequentially provide the first and second scan signals S1 and S2 to the plurality of pixels PX on a pixel-row basis through the plurality of first and second scan lines. The first scan control signal SCTRL1 may include, but not limited to, a first scan clock signal for generating the first scan signals S1, and the second scan control signal SCTRL2 may include, but not limited to, a second scan clock signal for generating the second scan signals S2. The first scan control signal SCTRL1 and the second scan control signal SCTRL2 may be collectively referred to as a scan control signal SCTRL. In one embodiment, the scan driver 130 may receive and use a common scan start signal for the first and second scan signals S1 and S2. In another embodiment, the scan driver 130 may receive and use different scan start signals for the first and second scan signals S1 and S2. The scan driver 130 may be integrated with or formed in a peripheral portion of the display panel 110. In other embodiments, the scan driver 130 may be implemented with or integrated in one or more integrated circuits.

The controller 150 may receive input image data IDAT and a control signal CTRL from a host processor (e.g., a graphic processing unit (GPU) or a graphic card). The input image data IDAT may be image data including red image data, green image data, and blue image data. The control signal CTRL may include, but not limited to, a vertical synchronization signal, a horizontal synchronization signal, an input data enable signal, a master clock signal, etc. The controller 150 may generate the data control signal DCTRL, the scan control signal SCTRL, and the output image data ODAT based on the control signal CTRL and the input image data IDAT received from the host processor. The controller 150 may control an operation of the data driver 120 by providing the data control signal DCTRL and the output image data ODAT to the data driver 120, and may control an operation of the scan driver 130 by providing the scan control signal SCTRL to the scan driver 130.

The host processor may provide the input image data IDAT to the display panel 100 at a variable input frame frequency VIFF (or a variable frame rate) by changing a time (or a duration of time) of a blank period in each frame period. The controller 150 may receive the input image data IDAT from the host processor at the variable input frame frequency VIFF that may be varied or changed within the driving frequency range. For example, a minimum driving frequency of the driving frequency range may be about 48 Hz, a maximum driving frequency of the driving frequency range may be about 240 Hz, and the range of the variable input frame frequency VIFF may be from about 48 Hz to about 240 Hz. Further, the controller 150 may control the data driver 120 and the scan driver 130 to drive the display panel 110 at the variable input frame frequency VIFF, or at the driving frequency DF that may be varied or changed within the driving frequency range. Herein, a mode of the display device 100 in which the display panel 110 is driven at the variable input frame frequency VIFF may be referred to as a variable frame mode. For example, the variable frame mode may be, but not limited to, a FreeSync mode, a G-Sync mode, etc.

In the example illustrated in FIG. 3, the host processor (e.g., the GPU or the graphic card) may perform rendering, and the display device 100 may display rendered image according to the rendered image in time periods FP1, FP2 and FP3. The renderings 210, 220 and 230 performed by the host processor may not be constant or regular, for example, in a case where the host processor renders game image data. The host processor may provide the input image data IDAT including first, second, and third frame data FD1, FD2, FD3, and FD4 to the display device 100 in synchronization with these irregular periods of the renderings in a variable frame mode. In the variable frame mode, each of the frame periods FP1, FP2 and FP3 may include an active period (e.g., AP1, AP2 and AP3) having a constant time length, and the host processor may provide the frame data FD1, FD2 and FD3 to the display device 100 at the variable input frame frequency VIFF by changing a time (or a duration of time) of a variable blank period (e.g., VBP1, VBP2 and VBP3) having a variable time length in each of the frame periods FP1, FP2 and FP3.

For example, while the host processor performs a rendering 210 for a second frame data FD2 at a frequency of about 240 Hz in a first frame period FP1, the host processor may provide a first frame data FD1 to the display device 100 during an active period AP1 of the first frame period FP1 at the variable input frame frequency VIFF of about 240 Hz in the first frame period FP1. Subsequently, the host processor may provide the second frame data FD2 that is rendered in the first frame period FP1 to the display device 100 during an active period AP2 of a second frame period FP2, and may continue a vertical blank period VBP2 of the second frame period FP2 until a rendering 220 for a third frame data FD3 is completed. For example, in the second frame period FP2, the rendering 220 for the third frame data FD3 may be performed at a frequency of about 48 Hz, and the host processor may provide the second frame data FD2 to the display device 100 at the variable input frame frequency VIFF of about 48 Hz by increasing the variable blank period VBP2 in the second frame period FP2. In a third frame period FP3, the host processor may perform a rendering 230 for a fourth frame data FD4 again at a frequency of about 240 Hz, and may provide the third frame data FD3 to the display device 100 during an active period AP3 of the third frame period FP3 at the variable input frame frequency VIFF of about 240 Hz.

As described above, in the variable frame mode, each frame period FP1, FP2 and FP3 may include an active period (e.g., AP1, AP2 and AP3) having a constant time length regardless of the variable input frame frequency VIFF, and a variable blank period (e.g., VBP1, VBP2 and VBP3) having a variable time length corresponding to the variable input frame frequency VIFF. For example, the variable blank period VBP1, VBP2 and VBP3 may increase as the variable input frame frequency VIFF decreases. In one embodiment, the controller 150 may receive the input image data IDAT at the variable input frame frequency VIFF, and may output the output image data ODAT to the data driver 120 at the driving frequency DF that may be substantially the same as the variable input frame frequency VIFF. Accordingly, the display device 100 supporting the variable frame mode may display an image in synchronization with the variable input frame frequency VIFF, thereby reducing or preventing a tearing phenomenon that may be caused by a frame frequency mismatch.

Each pixel PX of the display panel 110 may substantially simultaneously receive the first scan signal S1 and the second scan signal S2 in each of the frame periods FP1, FP2 and FP3. While the first and second scan signals S1 and S2 are applied to each pixel PX, the data voltage DV may be applied to the gate node NG, or the first electrode of the capacitor CST, and the reference voltage VREF may be applied to the source node NS, or the second electrode of the capacitor CST. Thus, while the first and second scan signals S1 and S2 are applied to each pixel PX, the capacitor CST may store the data voltage DV (or a difference between the data voltage DV and the reference voltage VREF). However, while the first and second scan signals S1 and S2 are applied to each pixel PX, the source node NS coupled to the anode of the light emitting diode LED may have the reference voltage VREF, and thus the light emitting diode LED may not emit light. In some embodiments, the reference voltage VREF may be lower than a threshold voltage of the light emitting diode LED such that the light emitting diode LED may not emit light while the first and second scan signals S1 and S2 are applied to each pixel PX. Further, during the same time, the number of application of the first and second scan signals S1 and S2 to each pixel, or the number of off-periods of the light emitting diode LED may be different from each other based on a driving frequency. A conventional display device may display an image with a luminance that may be changed depending on the driving frequency of the display panel even when the image has the same gray level, and therefore a flicker may occur when the driving frequency of the display panel is changed.

FIG. 4 illustrates an example illustrating a luminance difference in a conventional display device based on a driving frequency. The conventional display device may have a luminance 310 when the display panel is driven at the driving frequency of about 48 Hz, and a luminance 330 when the display panel is driven at the driving frequency of about 240 Hz. As illustrated in FIG. 4, during the same time period (e.g., about 53 ms), each light emitting diode LED of the display panel of the conventional display device may be off about 2.5 times when the driving frequency is about 48 Hz while each light emitting diode LED of the display panel 110 may be off about 13 times when the driving frequency is about 240 Hz. Accordingly, an average luminance AVGLUM2 of the display panel driven at the driving frequency of about 240 Hz may be lower than an average luminance AVGLUM1 of the display panel driven at the driving frequency of about 48 Hz. FIG. 5 illustrates an example of a luminance difference of the display panel driven at the driving frequency of about 240 Hz and about 48 Hz according to a gray level of an image in the conventional display device. For example, the display panel driven at the driving frequency of about 240 Hz and at the driving frequency of about 48 Hz may have a luminance difference of about 0 nit through about −0.1 nit.

The display device 100 may reduce or prevent a luminance difference of the display panel 110 even when the display panel 110 may be driven at different driving frequencies DF. In one embodiment, the scan driver 130 may provide the first scan signal S1 to each pixel PX at the variable input frame frequency VIFF, or the driving frequency DF that may be varied or changed within the driving frequency range (e.g., from about 48 Hz to about 240 Hz), and may provide the second scan signal S2 to each pixel PX at the maximum driving frequency, for example about 240 Hz. The maximum driving frequency may refer to the highest driving frequency within the driving frequency range that is predetermined and/or fixed unlike the driving frequency DF that is variable. The maximum driving frequency may be equal to or higher than the driving frequency DF.

FIG. 6 illustrates an example 410 of signals including first and second scan signals S1_1, S2_1, . . . , S1_N, and S2_N and voltages V_NS_1, . . . , and V_NS_N for the plurality of pixels PX in a case where the display panel 110 is driven at a maximum driving frequency (e.g., about 240 Hz), and an example 430 of signals including the first and second scan signals S1_1, S2_1, . . . , S1_N, and S2_N and voltages V_NS_1, . . . , and V_NS_N for the plurality of pixels PX in a case where the display panel 110 is driven at the driving frequency DF (e.g., about 80 Hz) that is lower than the maximum driving frequency.

In the example 410, the display panel 110 may be driven at the maximum driving frequency of about 240 Hz, and the scan driver 130 may sequentially provide the first scan signals S1_1, . . . , and S1_N and the second scan signals S2_1, . . . , and S2_N to the plurality of pixels PX on a pixel-row basis in the active periods AP1, AP2 and AP3 of the frame periods FP1, FP2 and FP3. The scan driver 130 may not provide the first and second scan signals S1_1, S2_1, . . . , S1_N, and S2_N to the plurality of pixels PX in the variable blank periods VBP1, VBP2 and VBP3 of the frame periods FP1, FP2 and FP3. While the first and second scan signals S1_1 and S2_1 are applied to each pixel PX in a first pixel row, the data voltage DV may be applied to the gate node NG, or the first electrode of the capacitor CST, and the reference voltage VREF may be applied to the source node NS, or the second electrode of the capacitor CST. Thus, while the first and second scan signals S1_1 and S2_1 are applied to each pixel PX, the capacitor CST may store the data voltage DV (or a difference between the data voltage DV and the reference voltage VREF), and a voltage V_NS_1 of the source node NS coupled to the anode of the light emitting diode LED may be changed from the first power supply voltage ELVDD to the reference voltage VREF. Accordingly, while the first and second scan signals S1_1 and S2_1 are applied to each pixel PX, the light emitting diode LED may not emit light.

Further, in the example 430, the display panel 110 may be driven at the driving frequency of about 80 Hz that is lower than the maximum driving frequency of about 240 Hz, and the scan driver 130 may sequentially provide the first scan signals S1_1, . . . , and S1_N and the second scan signals S2_1, . . . , and S2_N to the plurality of pixels PX on a pixel-row basis in the active period AP4 of the frame period FP4, but may not provide the first scan signals S1_1, . . . , and S1_N to the plurality of pixels PX in the variable blank period VBP4 of the frame period FP4. However, the scan driver 130 may sequentially provide the second scan signals S2_1, . . . , and S2_N to the plurality of pixels PX at least once on a pixel-row basis in the variable blank period VBP4 of the frame period FP4. In the example 430 where the display panel 110 is driven at the driving frequency of about 80 Hz lower than the maximum driving frequency of about 240 Hz, the scan driver 130 may provide the second scan signal S2_1 to each pixel PX in the first pixel row twice in the variable blank period VBP4. While the first scan signal S1_1 is not applied and only the second scan signal S2_1 is applied to each pixel PX in the first pixel row in the variable blank period VBP4, the third transistor T3 may apply the reference voltage VREF to the source node NS coupled to the anode of the light emitting diode LED, and the voltage V_NS_1 of the source node NS may be changed from the first power supply voltage ELVDD to the reference voltage VREF. In one embodiment, the reference voltage VREF may be lower than the threshold voltage of the light emitting diode LED, and thus the light emitting diode LED may not emit light by the voltage V_NS_1 of the source node NS corresponding to the reference voltage VREF. Accordingly, the light emitting diode LED may not emit light not only in a period the first and second scan signals S1_1 and S2_1 are applied, but also in a period only the second scan signal S2_1 is applied.

Thus, in the example 410 where the display panel 110 is driven at the maximum driving frequency of about 240 Hz and in the example 430 where the display panel 110 is driven at the driving frequency of about 80 Hz that is lower than the maximum driving frequency, the number of off-periods of the light emitting diode LED may be substantially the same as each other. Accordingly, in the display device 100 according to one embodiment, even if the driving frequency DF of the display panel 110 is changed, a luminance of the display panel 110 may be unchanged, and a flicker may not occur.

FIG. 7 illustrates an example illustrating luminance of the display device 100. The display device 100 may have a luminance 510 when the display panel 110 is driven at the driving frequency DF of about 48 Hz, and a luminance 530 when the display panel 110 is driven at the driving frequency DF of about 240 Hz according to one embodiment. As illustrated in FIG. 7, during the same time period (e.g., about 53 ms), each light emitting diode LED of the display panel 110 of the display device 100 may be off substantially the same number of times (i.e., about 13 times) either when the driving frequency DF is about 48 Hz and or the driving frequency DF about 240 Hz. Accordingly, the display panel 110 of the display device 100 that is driven at the driving frequency DF of about 48 Hz and at the driving frequency DF of about 240 Hz may have substantially the same luminance.

As described above, the display panel 110 of the display device 100 may be driven at the driving frequency DF that may be varied or changed within the driving frequency range. The scan driver 130 may provide the first scan signal S1 to each pixel PX at the driving frequency DF that may be varied or changed, and may provide the second scan signal S2 to each pixel PX at the maximum driving frequency that is a fixed frequency. Accordingly, a luminance difference of the display panel 110 that is driven at different driving frequencies DF may be reduced or prevented.

Figure 8:
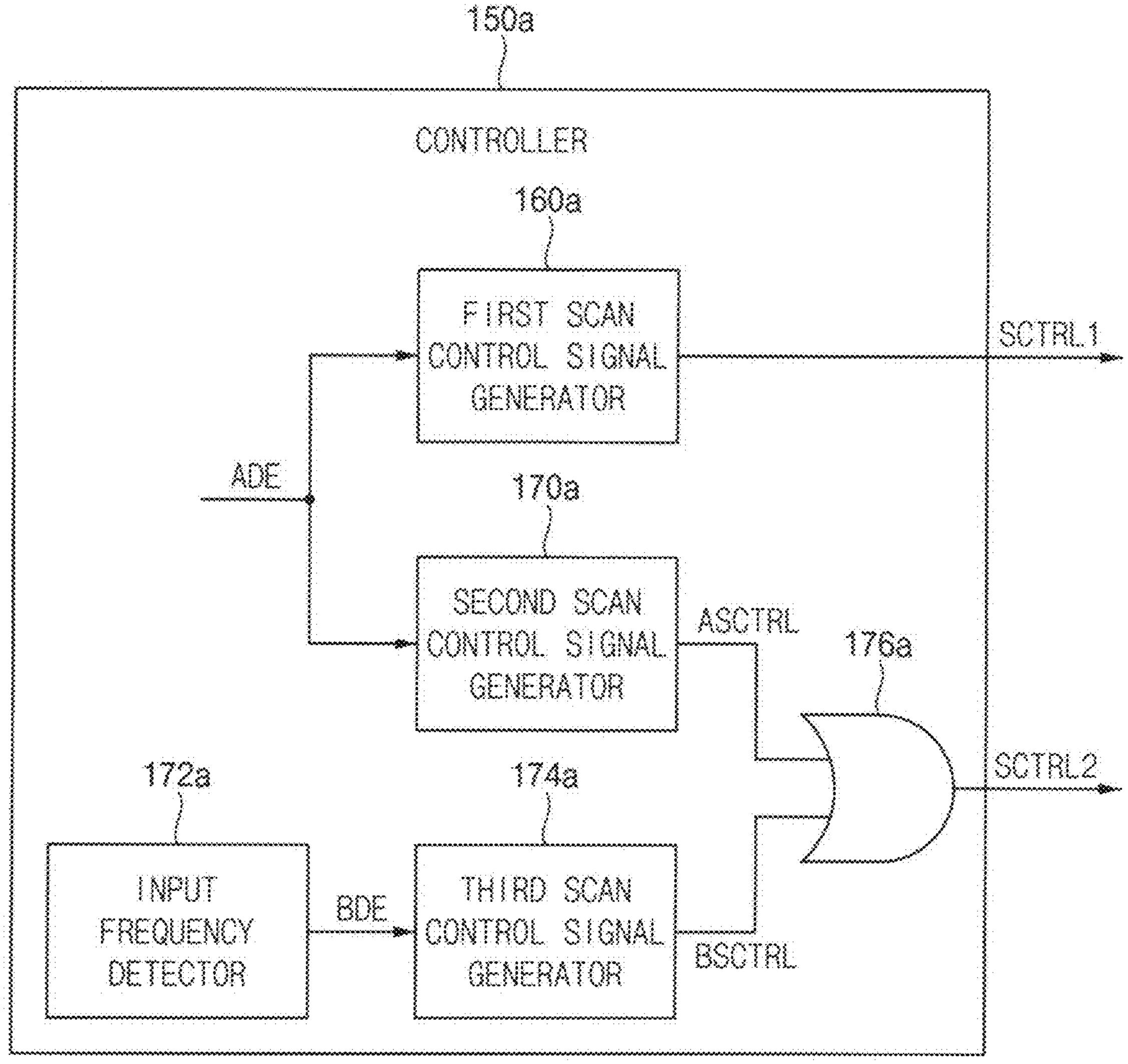
FIG. 8 is a block diagram of a controller included in a display device according to one embodiment.
Figure 9:
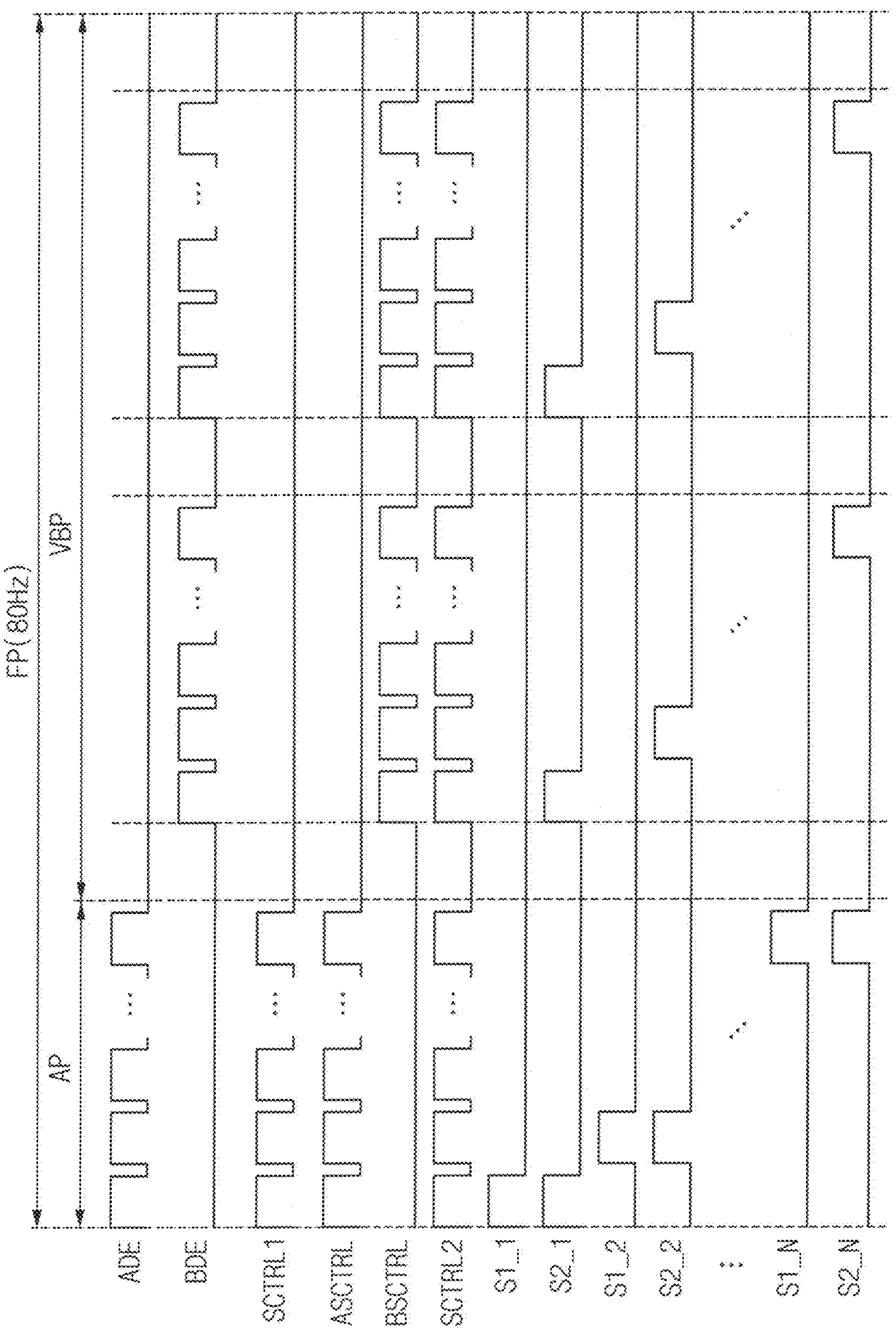
FIG. 9 is a timing diagram for describing an example of an operation of a display device including the controller of FIG. 8.

FIG. 8 is a block diagram of a controller included in a display device according to one embodiment, and FIG. 9 is a timing diagram for describing an example of an operation of a display device including the controller of FIG. 8.

Referring to FIGS. 1, 8 and 9, the display device 100 may include a controller 150*a* that includes a first scan control signal generator 160*a*, a second scan control signal generator 170*a*, an input frequency detector 172*a*, a third scan control signal generator 174*a*, and an OR gate 176*a*. The controller 150*a* may provide the first scan control signal SCTRL1 for generating the first scan signals S1_1, S1_2, . . . , and S1_N and the second scan control signal SCTRL2 for generating the second scan signals S2_1, S2_2, . . . , and S2_N to the scan driver 130.

In an active period AP of a frame period FP, the first scan control signal generator 160*a* may generate the first scan control signal SCTRL1 having a plurality of pulses respectively corresponding to a plurality of pixel rows of a display panel 110, and may provide the first scan control signal SCTRL1 to the scan driver 130. For example, the first scan control signal generator 160*a* may generate the first scan control signal SCTRL1 based on, but not limited to, an active data enable signal ADE that toggles in the active period AP.

The second scan control signal generator 170*a* may generate an active scan control signal ASCTRL having a plurality of pulses respectively corresponding to the plurality of pixel rows of the display panel 110 in the active period AP of the frame period FP. For example, the second scan control signal generator 170*a* may generate the active scan control signal ASCTRL based on, but not limited to, the active data enable signal ADE that toggles in the active period AP.

The input frequency detector 172*a* may detect the variable input frame frequency VIFF of the input image data IDAT. In one embodiment, the input frequency detector 172*a* may receive timing information through an auxiliary channel from the host processor, and may detect the variable input frame frequency VIFF based on the timing information. In another embodiment, the input frequency detector 172*a* may monitor a signal, for example a control signal, a timing signal, etc., that is received from the host processor to detect the variable input frame frequency VIFF. Further, in some embodiments, the input frequency detector 172*a* may provide the third scan control signal generator 174*a* with a (masked) blank data enable signal BDE that toggles in a variable blank period VBP corresponding to the detected variable input frame frequency VIFF.

In a case where the variable input frame frequency VIFF detected by the input frequency detector 172*a* is lower than a maximum driving frequency of the display panel 110, the third scan control signal generator 174*a* may generate a blank scan control signal BSCTRL in the variable blank period VBP. In one embodiment, the third scan control signal generator 174*a* may generate the blank scan control signal BSCTRL based on, but not limited to, the (masked) blank data enable signal BDE that toggles in the variable blank period VBP.

The OR gate 176*a* may generate the second scan control signal SCTRL2 by performing an OR operation on the active scan control signal ASCTRL received from the second scan control signal generator 170*a* and the blank scan control signal BSCTRL received from the third scan control signal generator 174*a*, and may provide the second scan control signal SCTRL2 to the scan driver 130. Referring to FIG. 9, the second scan control signal SCTRL2 may include a set of the plurality of pulses respectively corresponding to the plurality of pixel rows in the active period AP, and may include one or more sets of the plurality of pulses respectively corresponding to the plurality of pixel rows in the variable blank period VBP even in the case where the variable input frame frequency VIFF is lower than the maximum driving frequency. Accordingly, in response to the second scan control signal SCTRL2, the scan driver 130 may sequentially generate the second scan signals S2_1, S2_2, . . . , and S2_N in the active period AP, and may sequentially generate the second scan signals S2_1, S2_2, . . . , and S2_N at least once in the variable blank period VBP. Therefore, a luminance difference of the display panel 110 that is driven at different driving frequencies DF may be reduced or prevented.

Figure 10:
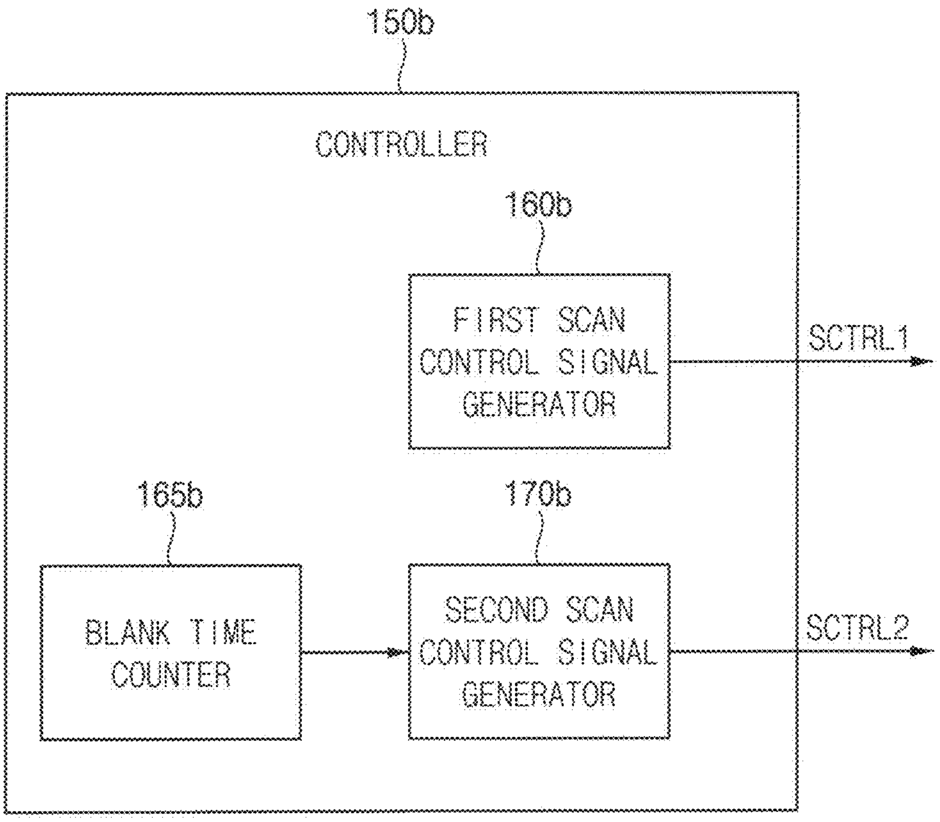
FIG. 10 is a block diagram of a controller included in a display device according to one embodiment.
Figure 11:
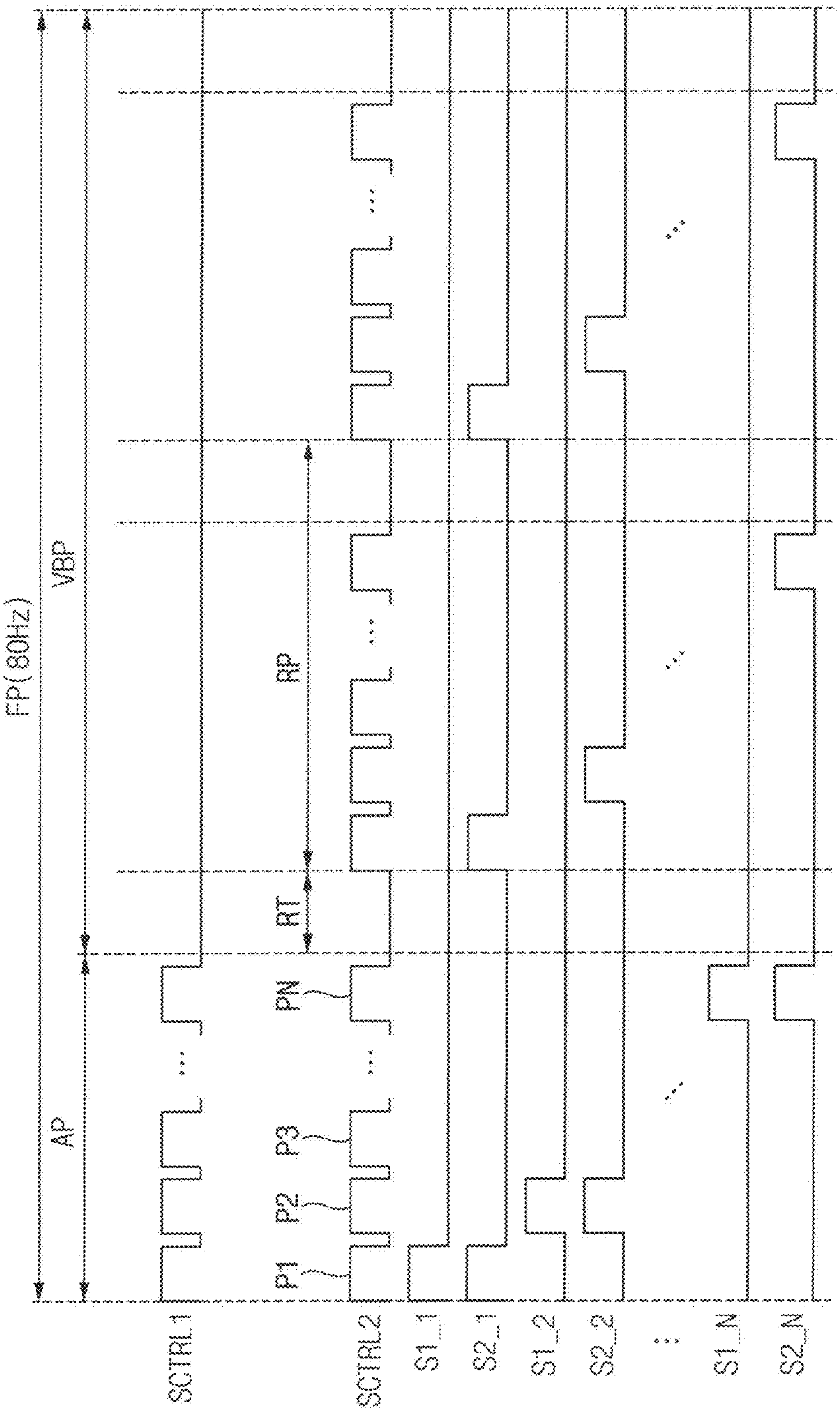
FIG. 11 is a timing diagram for describing an example of an operation of a display device including the controller of FIG. 10.

FIG. 10 is a block diagram of a controller included in a display device according to one embodiment, and FIG. 11 is a timing diagram for describing an example of an operation of a display device including the controller of FIG. 10.

Referring to FIGS. 1, 10 and 11, the display device 100 may include a controller that includes a first scan control signal generator 160*b*, a blank time counter 165*b*, and a second scan control signal generator 170*b*. The controller 150*b* may provide the first scan control signal SCTRL1 for generating the first scan signals S1_1, S1_2, . . . , and S1_N and the second scan control signal SCTRL2 for generating the second scan signals S2_1, S2_2, . . . , and S2_N to the scan driver 130.

In an active period AP of the frame period FP, the first scan control signal generator 160*b* may generate the first scan control signal SCTRL1 having a plurality of pulses respectively corresponding to a plurality of pixel rows of a display panel 110, and may provide the first scan control signal SCTRL1 to the scan driver 130.

The blank time counter 165*b* may count a time of the variable blank period VBP, and may provide a counted time of the variable blank period VBP to the second scan control signal generator 170*b*.

The second scan control signal generator 170*b* may provide the second scan control signal SCTRL2 having a plurality of pulses P1, P2, P3, . . . , and PN respectively corresponding to the plurality of pixel rows of the display panel 110 to the scan driver 130 in the active period AP. Further, when the counted time of the variable blank period VBP reaches a reference time RT, the second scan control signal generator 170*b* may provide the second scan control signal SCTRL2 having the plurality of pulses P1, P2, P3, . . . , and PN to the scan driver 130 in a reference period RP. In one embodiment, the reference time RT may correspond to a minimum blank time of the variable blank period VBP corresponding to a maximum driving frequency of a driving frequency range, and the reference period RP may correspond to a minimum frame time of the frame period FP corresponding to the maximum driving frequency. Accordingly, in response to the second scan control signal SCTRL2, the scan driver 130 may sequentially generate the second scan signals S2_1, S2_2, . . . , and S2_N in the active period AP, and may sequentially generate the second scan signals S2_1, S2_2, . . . , and S2_N at least once in the variable blank period VBP. Therefore, a luminance difference of the display panel 110 that is driven at different driving frequencies DF may be reduced or prevented.

Figure 12:
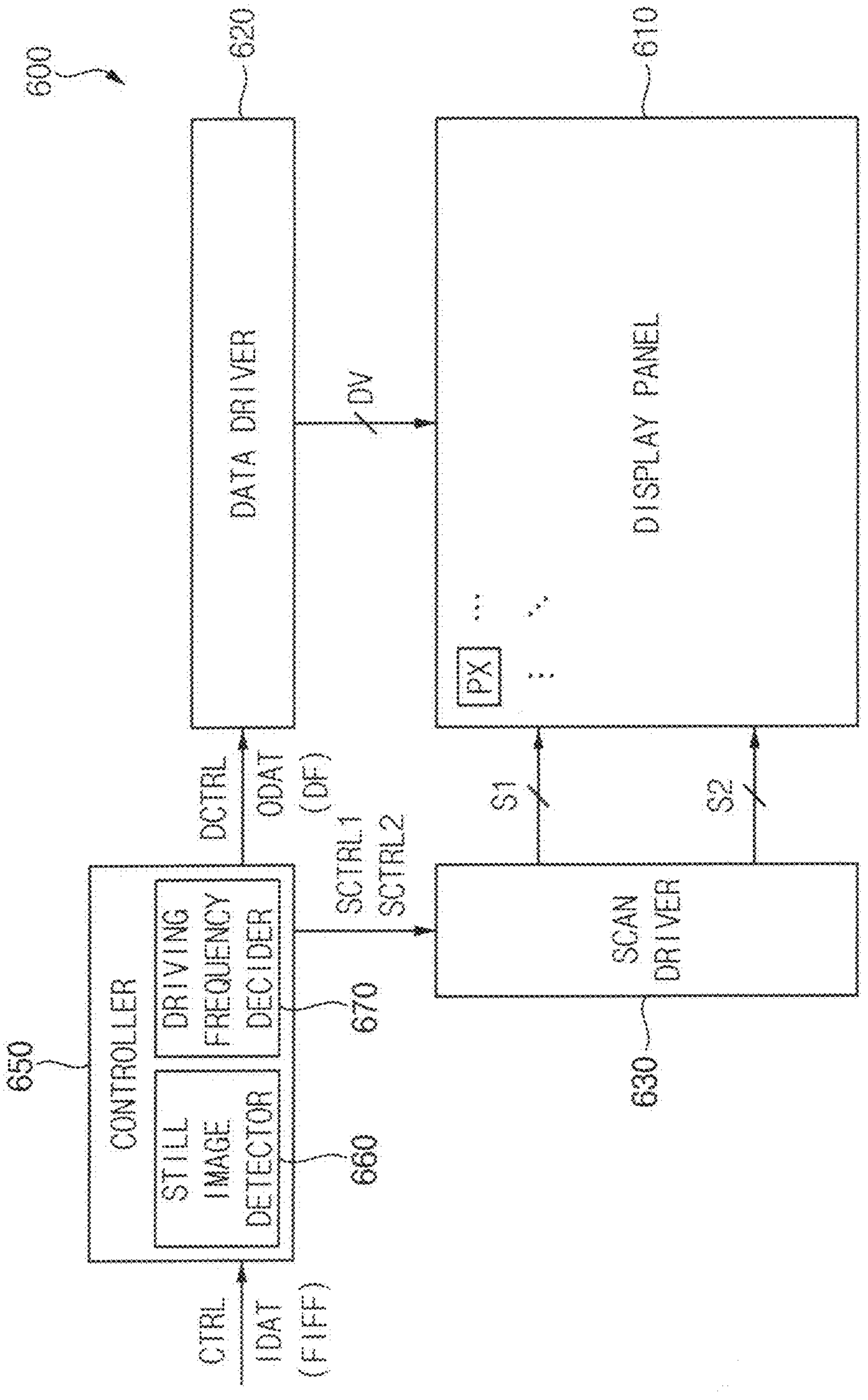
FIG. 12 is a block diagram of a display device according to one embodiment.
Figure 13:
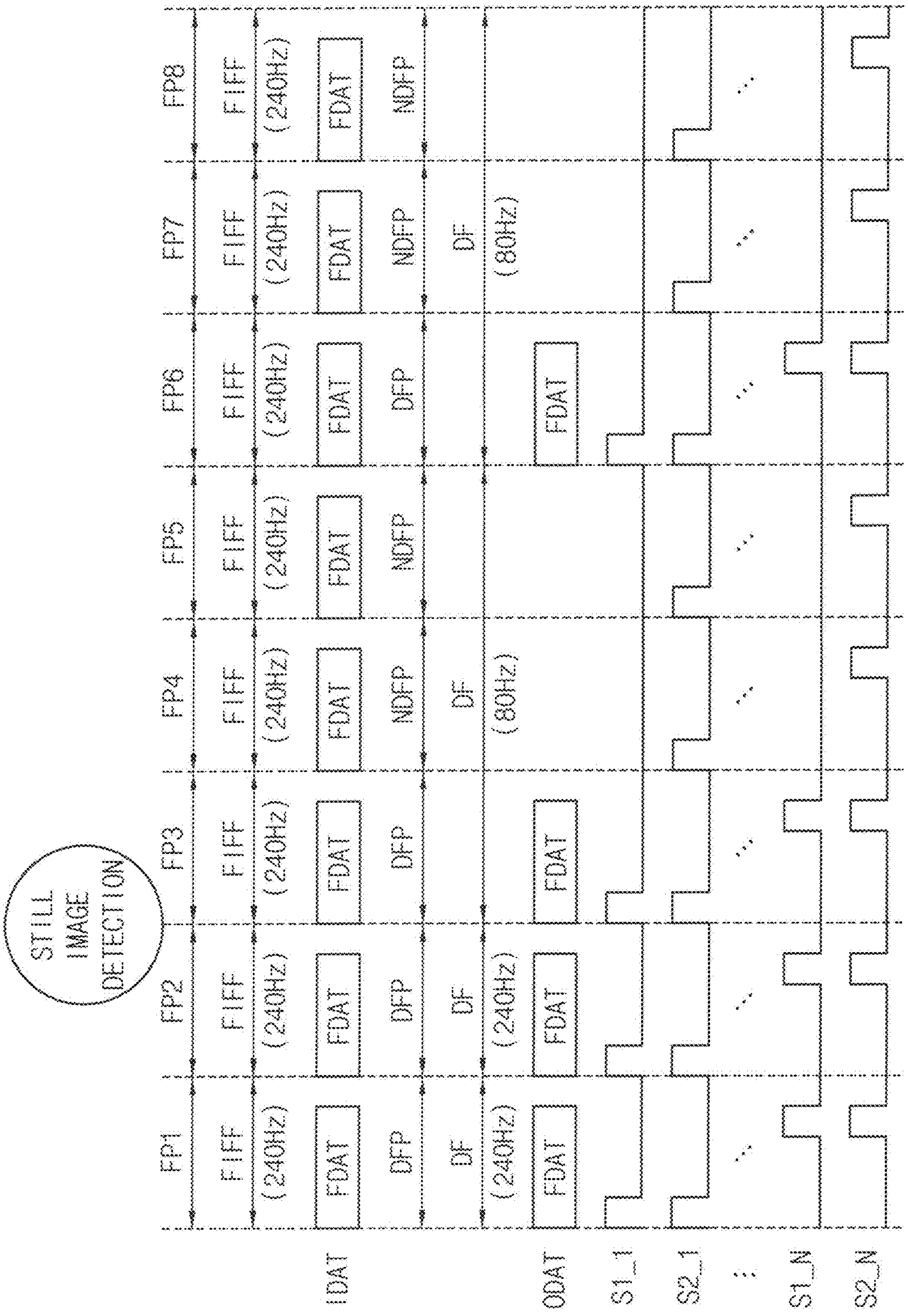
FIG. 13 is a timing diagram for describing an example of an operation of a display device according to one embodiment.

FIG. 12 is a block diagram of a display device according to one embodiment, and FIG. 13 is a timing diagram for describing an example of an operation of a display device according to one embodiment.

Referring to FIG. 12, a display device 600 may include a display panel 610, a data driver 620, a scan driver 630, and a controller 650. The display device 600 may have a similar configuration and a similar operation to the display device 100 of FIG. 1 except that the controller 650 receives the input image data IDAT at a fixed input frame frequency FIFF, and the controller 650 may include a still image detector 660 and a driving frequency decider 670.

The controller 650 may receive the input image data IDAT at the fixed input frame frequency FIFF, or a maximum driving frequency of a driving frequency range of the display panel 610. Further, the controller 650 may determine a driving frequency DF of the display panel 610 based on the input image data IDAT using the still image detector 660 and the driving frequency decider 670.

The still image detector 660 may determine whether the input image data IDAT represent a still image. In one embodiment, the still image detector 660 may determine whether the input image data IDAT represent the still image by comparing the input image data IDAT in a previous frame period and the input image data IDAT in a current frame period.

The driving frequency decider 670 may determine the driving frequency DF of the display panel 610 based on the determination of the still image detector 660. In one embodiment, the driving frequency decider 670 may determine the driving frequency DF of the display panel 610 as the fixed input frame frequency FIFF, or the maximum driving frequency in a case where the input image data IDAT do not represent a still image, and may determine the driving frequency DF of the display panel 610 as a frequency lower than the fixed input frame frequency FIFF in a case where the input image data IDAT represent a still image. In one embodiment, in a case where the input image data IDAT represent a still image, the driving frequency decider 670 may determine a flicker value (e.g., representing a degree of a flicker perceived by a user) according to a gray level (or a luminance) of the input image data IDAT, and may determine the driving frequency DF of the display panel 610 according to the determined flicker value. The flicker value may be determined by looking up a flicker lookup table that stores flicker values corresponding to a plurality of gray levels.

In the case where the input image data IDAT do not represent a still image, to drive the display panel 610 at the driving frequency DF that is the maximum driving frequency, the controller 650 may drive the display panel 610 at the driving frequency DF that is the maximum driving frequency by setting each frame period as a driving frame period in which the display panel 610 is driven. In the driving frame period, the scan driver 630 may provide the first and second scan signals S1 and S2 to each pixel PX.

In the case where the input image data IDAT represent a still image, the controller 650 may drive the display panel 610 at the driving frequency DF that is lower than the maximum driving frequency by setting at least one first frame period of a plurality of frame periods as the driving frame period, and setting at least one second frame period of the plurality of frame periods as a non-driving frame period in which the display panel 610 is not driven. In the driving frame period, the scan driver 630 may provide the first and second scan signals S1 and S2 to each pixel PX. However, in the non-driving frame period, the scan driver 630 may not provide the first scan signal S1 to each pixel PX, and may provide only the second scan signal S2 to each pixel PX.

In the example illustrated in FIG. 13, the still image detector 660 may detect that the input image data IDAT do not represent a still image in first and second frame periods FP1 and FP2, and the controller 650 may set the first and second frame periods FP1 and FP2 as the driving frame periods DFP. The controller 650 may receive, as the input image data IDAT, frame data FDAT at the fixed input frame frequency FIFF of about 240 Hz, and may provide, as the output image data ODAT, the frame data FDAT to the data driver 620 at the driving frequency DF of about 240 Hz that is substantially the same as the fixed input frame frequency FIFF. Further, in each driving frame period DFP (i.e., the first and second frame periods FP1 and FP2), the scan driver 630 may sequentially provide the first scan signals S1_1, . . . , and S1_N and the second scan signals S2_1, . . . , and S2_N to the plurality of pixels PX on a pixel-row basis. Accordingly, the display panel 610 may be driven at the driving frequency DF of about 240 Hz in the first and second frame periods FP1 and FP2.

The still image detector 660 may detect a still image, and the controller 650 may determine that the driving frequency DF of the display panel 610 is lower (e.g., 80 Hz) than the fixed input frame frequency FIFF of about 240 Hz. In the example shown in FIG. 13, the controller 650 may drive the display panel 610 at the driving frequency DF of about 80 Hz by setting third and sixth frame periods FP3 and FP6 as the driving frame periods DFP, and may set fourth, fifth, seventh, and eighth frame periods FP4, FP5, FP7 and FP8 as the non-driving frame periods NDFP. The controller 650 may provide the frame data FDAT to the data driver 620 in the third and sixth frame periods FP3 and FP6 that are the driving frame periods DFP, and may not provide the frame data FDAT to the data driver 620 in the fourth, fifth, seventh and eighth frame periods FP4, FP5, FP7 and FP8 that are the non-driving frame periods NDFP. Further, in each driving frame period DFP, the scan driver 630 may sequentially provide the first scan signals S1_1, . . . , and S1_N and the second scan signals S2_1, . . . , and S2_N to the plurality of pixels PX on a pixel-row basis. However, in each non-driving frame period NDFP, the scan driver 630 may not provide the first scan signals S1_1, . . . , and S1_N to the plurality of pixels PX, and may sequentially provide only the second scan signals S2_1, . . . , and S2_N to the plurality of pixels PX on a pixel-row basis. Accordingly, the display panel 610 may be driven at the driving frequency DF of about 80 Hz, but the number of off-periods of each light emitting diode of the display panel 610 may be substantially the same as the number of off-periods of each light emitting diode of the display panel 610 driven at the driving frequency DF of about 240 Hz. Accordingly, the display panel 610 driven at different driving frequencies DF may have substantially the same luminance.

Although FIG. 13 illustrates an example where the fixed input frame frequency FIFF, or the maximum driving frequency of the driving frequency range is about 240 Hz, the present disclosure is not limited to the example of FIG. 13.

As described above, in the display device 600, the display panel 610 may be driven at the driving frequency DF that is varied or changed within the driving frequency range. The scan driver 630 may provide the first scan signal S1 to each pixel PX at the driving frequency DF that is a variable frequency, and may provide the second scan signal S2 to each pixel PX at the fixed input frame frequency FIFF, or the maximum driving frequency. Accordingly, a luminance difference of the display panel 610 that is driven at different driving frequencies DF may be reduced or prevented.

Figure 14:
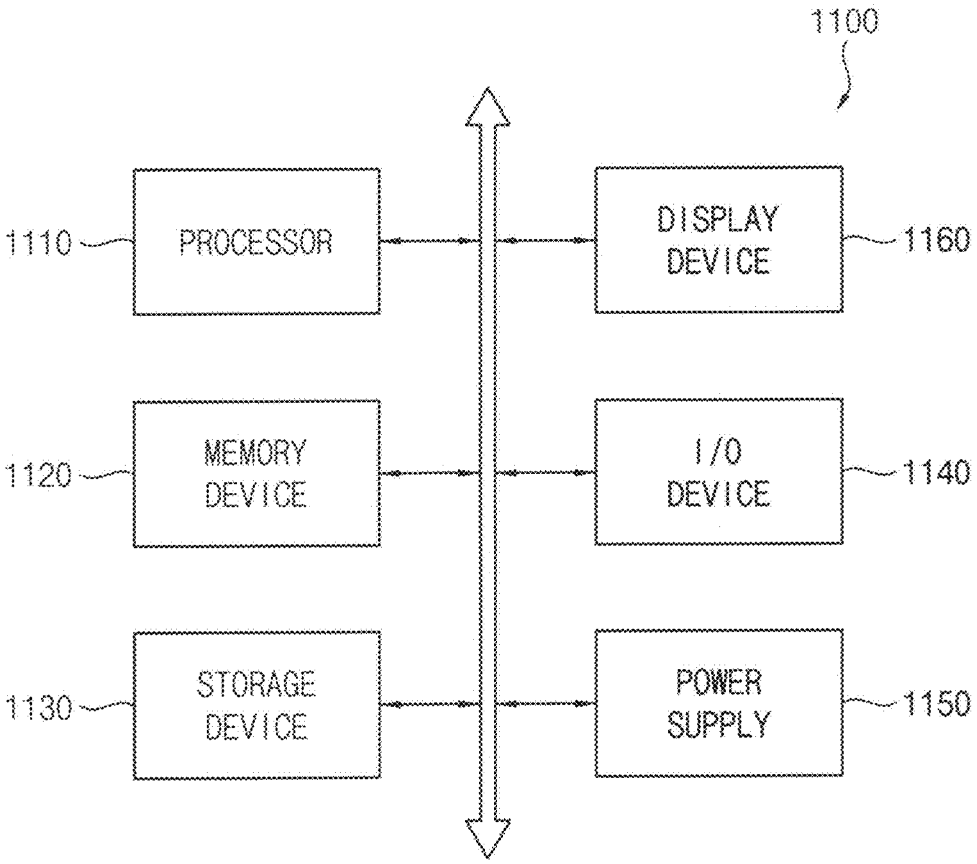
FIG. 14 is a block diagram illustrating an electronic device including a display device according to one embodiment.

FIG. 14 is a block diagram illustrating an electronic device including a display device according to one embodiment.

Referring to FIG. 14, an electronic device 1100 may include a processor 1110, a memory device 1120, a storage device 1130, an input/output (I/O) device 1140, a power supply 1150, and a display device 1160. The electronic device 1100 may further include a plurality of ports for communicating with various peripheral devices including, but not limited to, a video card, a sound card, a memory card, a universal serial bus (USB) device, other electric devices, etc.

The processor 1110 may perform various computing functions or tasks. The processor 1110 may include an application processor (AP), a microprocessor, a central processing unit (CPU), etc. The processor 1110 may be coupled to other components of the electronic device 1100 via an address bus, a control bus, a data bus, etc. The processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may include a solid state drive (SSD) device, a hard disk drive (HDD) device, a CD-ROM device, etc. The I/O device 1140 may include an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links described above.

In the display device 1160, a display panel may be driven at a driving frequency that is varied or changed within a driving frequency range. In one embodiment, the display device 1160 may be the display device 100 of FIG. 1. A scan driver included in the display device 1160 may provide a first scan signal to each pixel at the driving frequency which is a variable frequency, and may provide a second scan signal to each pixel at a maximum driving frequency of the driving frequency range which is a fixed frequency. Accordingly, the display device 1160 may reduce or prevent a luminance difference of the display panel that is driven at different driving frequencies.

The present inventive concepts may be applied to any display device 1160 that is compatible with or supporting a variable frame mode, and any electronic device 1100 including the display device 1160. For example, the present inventive concepts may be applied to a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of some embodiments of the present disclosure and is not to be construed as limiting thereof. Although specific embodiments of the present disclosure have been described, those skilled in the art will readily appreciate that many modifications and/or deviations are possible without materially departing from the novel teachings and advantages of the present inventive concept. Accordingly, such modifications are intended to be included within the scope of the present disclosure including the appended claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the present disclosure including the appended claims.

What is claimed is:

1. An electronic device comprising:

a processor configured to provide input image data having a variable input frame frequency; and a display device, wherein the display device comprises:

a display panel including a plurality of pixels;

a data driver configured to provide a data voltage to the plurality of pixels;

a scan driver configured to provide a first scan signal and a second scan signal to the plurality of pixels; and a controller configured to control the data driver and the scan driver, wherein the display panel is driven at a driving frequency that is variable within a driving frequency range, wherein the scan driver provides the first scan signal and the second scan signal simultaneously to the plurality of pixels in a first period of a frame period, and provides only the second scan signal to the plurality of pixels in a second period of the frame period when the driving frequency of the display panel is lower than a maximum driving frequency, wherein the controller is further configured to receive the input image data having the variable input frame frequency, and the driving frequency of the display panel is determined according to the variable input frame frequency, wherein the first period of the frame period is an active period having a constant time length, and the second period of the frame period is a variable blank period having a variable time length, and wherein the controller includes:

a first scan control signal generator configured to provide a first scan control signal to the scan driver in the active period;

a second scan control signal generator configured to generate an active scan control signal in the active period;

an input frequency detector configured to detect the variable input frame frequency;

a third scan control signal generator configured to generate a blank scan control signal in the variable blank period when the variable input frame frequency detected by the input frequency detector is lower than the maximum driving frequency; and an OR gate configured to generate a second scan control signal by performing an OR operation on the active scan control signal and the blank scan control signal, and to provide the second scan control signal to the scan driver.

2. The electronic device of claim 1, wherein, when the driving frequency of the display panel is the maximum driving frequency, the scan driver provides the first scan signal and the second scan signal to the plurality of pixels in the active period, and the scan driver does not provide the first scan signal and the second scan signal to the plurality of pixels in the variable blank period, and wherein, when the driving frequency of the display panel is lower than the maximum driving frequency, the scan driver provides the first scan signal and the second scan signal in the active period, and the scan driver provides only the second scan signal at least once to the plurality of pixels in the variable blank period.

* * * * *